UNITED STATES PATENT OFFICE 2,615,000

SULFONAMIDES FORMED BY AMIDATION OF CHLOROSULFONATED POLYETHYLENE

Harris Walton Bradley, Bellefonte Heights, Del., assignor to E. I. du Pont de Nemours and Company, Wilmington, Del., a corporation of Delaware No Drawing. Application July 2, 1949, Serial No. 102,929

7 Claims. (Cl. 260—31.2)

This invention relates to novel resinous compositions of matter. More particularly, this invention deals with novel resinous compounds characterized by their capacity to produce thermoplastic, continuous films and protective coatings.

It is an object of this invention to convert polyethylene polymers into thermoplastic resins useful for producing films and protective coatings. Additional important objects of this invention will appear as the description proceeds.

U. S. Patent No. 2,212,786 to McQueen teaches a process for producing polysulfonyl derivatives of polythenes and related olefinic polymers, by treating said polymers with a mixture of gaseous chlorine and sulfur dioxide while under the influence of actinic light. The term "polythenes" is defined in said patent as referring to solid ethylene polymers. The products, which contain also directly combined chlorine, are then hydrolyzed to convert the SO₂Cl groups into alkali-metal sulfonate groups. In this form the products are soluble in water and are useful as tanning agents.

I have now found that polysulfonyl chlorides of the types produced by McQueen are capable of being converted into thermoplastic substances having commercially desirable physical and chemical properties, by treating the same under certain special conditions, as hereinbelow defined, to convert them into polysulfonamides.

The first of the aforesaid conditions is the choice of the initial polyolefine from among the numerous alternatives indicated by McQueen, and the selection of an average molecular weight to match the particular material selected. Thus, I find that for the purpose of my invention polyethylene forms the best initial material, provided its degree of polymerization is such as to give it an average molecular weight of about 9000 to about 12,000. On the other hand, polyisobutylene will also give satisfactory results provided its average molecular weight is at least 20,000 or, say, between 20,000 and 80,000.

Secondly, the treatment must be of such a nature as to produce sulfonamides, and not any ammonium sulfonate salts. Any treatment which permits hydrolysis of the sulfonyl chloride groups, even partially, into sulfonic acid groups or salts thereof appears to be fatal to the objects of this invention. Therefore, water, alkali, and alcohols must be avoided during the reaction.

As amidating agents I may employ ammonia or primary or secondary organic amines; in other words, organic amines having at least one exchangeable H-atom attached to the N-atom. The amine, however, should be free of OH groups and any additional primary or secondary amino groups, inasmuch as OH groups or additional amino groups might cause "cross-linking," that is reaction of one amine molecule with two or more SO₂Cl groups of the same polythene molecule or of different molecules of the polymer. Such cross-linking produces hard resins, lacking the thermoplastic quality, and incapable of producing a continuous film by solidification from molten state or by evaporation from dissolved state.

For best results I prefer to employ a mono amine consisting of carbon, hydrogen and nitrogen only, and which contains no radicals of more than 8 carbon atoms. Consequently, the amidating agents most desirable for my invention may be defined by the general formula

wherein $R_1$ and $R_2$ stand for hydrogen or hydrocarbon radicals of not more than 8 carbon atoms. As suitable illustrations at this point, may be mentioned ammonia; the monoalkyl amines, all the way from methyl to octyl inclusive; the dialkyl amines, in which each alkyl may have 1 to 8 carbon atoms; aniline, the toluidines; cyclohexyl amine and its lower homologs; diphenylamine; piperidine and its lower homologs, etc.

A fourth condition is the degree of sulfonylation of the polyolefine. In the case of polyethylene, the degree of sulfonylation should be such as to give the product, prior to amidation, a sulfur analysis of from 2 to 8%.

In the sulfonylation procedure according to McQueen, the introduction of directly combined chlorine is inevitable. The quantity thus introduced may be controlled to some extent by controlling the ratio of chlorine to sulfur dioxide in the stream of gases acting upon the initial polythene. But for the purpose of this invention the quantity of directly combined chlorine is not critical, and I have obtained good results with products analyzing as little as 5% and as high as 40% of total chlorine prior to amidation. For certain special purposes the quantity of chlorine tolerated or desired in the polysulfonated material may be decided on its own merits. For instance, a high chlorine content reduces the flammability of the resulting product.

The reaction generally produces ammonium chloride or an amine hydrochloride as a by-product, thus:

$$R-SO_2Cl + 2NH_3 \rightarrow R-SO_2NH_2 + NH_4Cl$$

or $$R-SO_2Cl + 2HNR_1R_2 \rightarrow R-SO_2NR_1R_2 + HNR_1R_2.HCl$$

A fifth important condition for my invention, then, is that the products be treated to eliminate therefrom these by-product salts. Fortunately, this can be readily accomplished by a simple process of extracting their solution with water, inasmuch as the sulfonamides of this invention and the solvents in which they are generally produced are both water-insoluble.

The amidation reaction generally runs to completion, that is, until all available $SO_2Cl$ groups have been consumed. This fact is confirmed by the nitrogen:sulfur ratio generally found in the product, provided the latter has been completely purified of by-product salts.

The reaction between the polythene-sulfonyl chloride and the nitrogen base is run under the necessary temperature and pressure conditions to maintain the nitrogen base in the liquid state, but at a temperature not exceeding about 100° C. Temperatures in excess of about 100° C. usually result in discoloration and decomposition of the product. The reaction likewise is preferably carried out by adding the polythene-sulfonyl chloride to the nitrogen base so that the reaction mixture never contains a molar excess of the sulfonyl chloride, inasmuch as such excess favors imide formation. The polythene-sulfonyl chloride may be added in the absence of solvent, but it is preferred to dissolve the polymer in a solvent prior to the amidation step in order to facilitate intimate mixing with the base. Any solvent which dissolves the polythene-sulfonyl chloride and is essentially inert to the nitrogen base at the operating temperatures may be used. Examples of suitable solvents are carbon tetrachloride, mixtures of carbon tetrachloride and chloroform, and methyl isobutyl ketone. The preferred solvents are water-insoluble ketones (e. g., methylisobutyl ketone), since these are generally solvents for the polythene sulfonamides and permit removal of any by-product ammonium chloride or amine hydrochloride by extracting the solution with water.

The outstanding physical property of my novel compounds is their capacity to form a thermoplastic continuous film. Thus, the novel polythene-sulfonamides of this invention may be molten and cast into film, which makes these compounds useful for the production of transparent wrapping films or of photographic plates or ribbons. They also form tough, continuous films when dissolved in a solvent and evaporated. This property makes my novel compounds useful as protective coating agents for metals, textiles or paper, through incorporation for instance into lacquers, paints and varnishes.

Of particular interest in connection with the latter utility are the solubility properties of my novel compounds. I find that my novel products are soluble in common lacquer solvents, particularly aliphatic ketones such as acetone, methylisobutyl ketone, cyclohexanone and the like. They are also soluble in pyridine. By contrast, they are not soluble in aliphatic or aromatic hydrocarbons or in halogenated aliphatic compounds such as carbon tetrachloride.

Although the thermoplastic quality of their film has been emphasized as one of the principal characteristics of my novel compounds, they are capable of being readily converted, if desired, into thermosetting films. Such conversion is readily achieved by reaction with formaldehyde or with polyisocyanates. In both cases, the conversion is probably caused by cross-linking. Thus, in the case of formaldehyde, the sulfonamide groups are probably converted first to amido-methylol compounds, and then into diamido-methane compounds according to the following scheme:

$$2R-SO_2NH_2 + 2CH_2O \longrightarrow 2R-SO_2NH-CH_2OH \longrightarrow$$

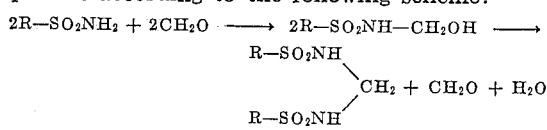

$$\begin{array}{c} R-SO_2NH \\ \diagdown \\ CH_2 + CH_2O + H_2O \\ \diagup \\ R-SO_2NH \end{array}$$

In the case of diisocyanates, for instance toluene diisocyanate, each sulfonamide group presumably reacts with one isocyanate group to give a urea structure, thus:

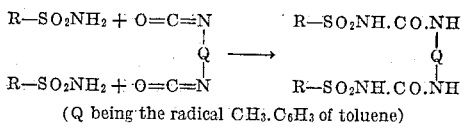

(Q being the radical $CH_3.C_6H_3$ of toluene)

In practice, this conversion into thermosetting state will generally be achieved after application of the polythene sulfonamide to a substratum, for instance textile fiber, by giving the latter an after-treatment with aqueous formaldehyde or toluene diisocyanate, followed, optionally by heating to say 100 to 150° C.

In addition to the above, many of the products of this invention have adhesive properties, which makes them useful as bonding agents for paper, leather and textiles. Altogether, my novel products are adapted for a large number of varied, industrial uses, of which the following list is suggestive but not exhaustive.

1. Protective coatings for paper, wood, metal, concrete, fibers and filaments;
2. Adhesives, especially bookbinding adhesives, general purpose adhesives, heat-sealing adhesives for paper, leather and textiles;
3. Textile finishing agents;
4. Shrink-proofing agents for wool;
5. Paper finishing agents, especially wet strength resins, grease and moisture resistant finishes;
6. Electrical cable paper resins;
7. Resin binders in pigment printing;
8. Pigment vehicles for lacquers and for coloring plastics;
9. Anti-crocking agents for certain plastics colors;
10. Fingernail polish;
11. Resin binders for flame-proofing agents;
12. Impregnation of filter cloths to prevent raveling and seepage;
13. Resin binders for linoleum-type products;
14. Resin bases for puttys, caulking compounds and cements;
15. Polythene adhesive;
16. Plastic films.

Applications of the polythene sulfonamides can be made from solution or from aqueous dispersion. It is preferred to use the same ketone solvent as that which provides the essential liquid medium for the amidation reaction. Alternately, it is possible to dissolve the solvent-free polythene sulfonamide in a different solvent for application. By emulsifying a solution of the sulfonamide in the presence of a protective colloid or emulsifying agent, or both, and subsequently removing the solvent by distillation, it is possible to prepare stable dispersions of polythene sulfonamides that deposit clear, tough, almost colorless films.

Without limiting my invention, the following examples are given to illustrate typical modifications thereof. Parts mentioned are by weight.

*Example 1*

A mixture of 500 g. of a low molecular weight polythene showing a viscosity of 125 poises at 125° C. (about 9,000 M. W.) and 5740 g. of carbon tetrachloride was charged to a 5 liter flask fitted with an agitator, a thermometer, a reflux condenser, and a gas inlet tube. The mixture was heated to 60°–70° C. to dissolve the polythene and at this temperature a mixture of 795 g. of sulfur dioxide and 585 g. of chlorine was passed into the charge over a period of 6 hours. The reaction mass was irradiated with actinic light from two 150 watt projector lamps. Carbon tetrachloride was then distilled off under reduced pressure until the mass became too viscous to be poured, and 1360 g. of methyl-isobutyl-ketone were added to dissolve the tacky polymeric sulfonyl chloride. This solution was added over a one hour period to about 3,000 g. of liquid ammonia in an enamel vessel. The amidation mass was stirred by means of a steel agitator and the temperature of the reaction was held at $-40°$ to $-50°$ C. After addition of the sulfonyl chloride solution, the amidation mass was allowed to warm up to 20° to 25° C. overnight. The resulting thick white tacky paste was further diluted with about 1300 g. methyl-isobutyl-ketone and washed three times with two liter portions of water. Ethanol was used to break the emulsions formed during the washing. The solvent layer was concentrated to a weight of 3807 g. This concentrate showed 20% solids on evaporation, and the tough, plastic residue showed the following composition by analysis: $S=6.2\%$, $N=2.7\%$, $Cl=21.5\%$. These values correspond to a yield of about 760 g. of polythene sulfonamide and indicate an average of one $-SO_2NH_2$ group about every 23 carbon atoms, and a chlorine atom about every seven carbon atoms. A film cast from this solution was practically colorless and provided a tough, adhesive protective coating for metals, wood, paper and other compositions.

*Example 2*

By the same general procedure as in Example 1, a sample of low molecular weight polythene (30 poise viscosity at 125° C., about 7,000 M. W.) was converted to an essentially solvent-free sulfonyl chloride that showed by analysis of 7.4% sulfur and 23.1% chlorine. A solution of 328 g. of this sulfonyl chloride in 700 cc. of toluene was amidated as in Example 1 by dropping into liquid ammonia. The resulting rubbery polymeric mass was subjected to a short steam distillation to remove most of the toluene and the polymer was then washed free of ammonium chloride and dried to constant weight on appropriate rubber mills. The dry product was a leathery, translucent, olive-brown polymer that weighed 280 g. and could be dissolved in ketone or ester solvent to furnish a general purpose adhesive.

*Example 3*

Five hundred grams of a low molecular weight polythene showing a viscosity of 2 poises at 125° C. (about 3,000 M. W.) were dissolved in 3600 g. of carbon tetrachloride at 70° C. and reacted as in Example 1 with a mixture of 264 g. of sulfur dioxide and 188 g. of chlorine. About 1600 g. of the gassed solution were diluted with 75 g. of chloroform and amidated by dropping into liquid ammonia as in the above examples. After the evaporation of the excess ammonia, the resulting white waxy solid mass was washed free of ammonia chloride and dried to constant weight on small rubber mills. The dry product was an almost transparent, soft, waxy polymer with much less tensile strength than the sulfonamides prepared from higher molecular weight polythenes of the preceding examples. The product was not readily soluble at 25° C. but dissolved at 60° in methyl-isobutyl-ketone and produced a waxy finish on textiles and paper treated with the solution. By analysis the dry polymer showed 4% sulfur, 1.7% nitrogen, and 10.3% chlorine.

*Example 4*

A solution of 365 g. of carbon tetrachloride and 135 g. of polythene sulfonyl chloride prepared according to the procedure given in Example 1 from low molecular weight polythene (30 poises viscosity at 125° C., about 7,000 M. W.) was charged to a one liter steel autoclave and 350 g. of liquid ammonia were added under pressure. The temperature in the autoclave increased from about 30° C. to 53° C. and a maximum pressure of about 160 pounds per square inch was developed. After the initial heat of reaction, the temperature fell to about 33° C., and the reaction mass was agitated at this temperature for about five hours. The autoclave was then vented and discharged. The brown polymeric product after washing and drying on the rubber mill weighed 107 g. and showed by analysis 6.4% sulfur, 3.2% nitrogen, and 21.0% chlorine. A pyridine solution of the product produced a tough, transparent, water insensitive film.

*Example 5*

A mixture of 1440 g. of carbon tetrachloride and 100 g. of electrical grade polythene showing an average molecular weight in the range 18,000–20,000 was heated to about 70° C. with agitation to effect solution. This solution was gassed according to the procedure of Example 1 with a mixture of 44 g. of sulfur dioxide and 33 g. of chlorine over a period of 20 minutes. The gassed charge was concentrated by distillation to approximately 800 g., and 3 liters of methyl-isobutyl-ketone were added. The resulting mixture formed a viscous solution at 75°–80° C. which was added to liquid ammonia at $-40°$ to $-50°$ C. as in Example 1. When the excess ammonia had evaporated, an additional 4 liters of methyl-isobutyl-ketone were added, and the resulting solution was washed free of ammonium chloride with water at a temperature of 95°–98° C. The solution was then concentrated to 2220 g. and 600 g. of xylene were added, which appeared to aid solubility at about 60°–70° C. The final mixture of product and solvent after considerable mechanical loss weighed 2809 g., showed 4% solids, formed a viscous solution at 65° C., and set up to a stiff gel at 30° C. The active ingredient showed by analysis 2.2% sulphur and 7.6% chlorine. A hot solution of this polythene sulfonamide deposited a film on a sheet of polythene that enabled the polythene sheet to be heat sealed to paper, fabrics and metal.

Example 6

According to the procedure of Example 1, 500 g. of low molecular weight polythene (125 poises viscosity at 125° C., about 9,000 M. W.) in 5740 g. of carbon tetrachloride were gassed at 68°–70° C. under the influence of activating light with a mixture of 132 g. of sulfur dioxide and 97 g. of chlorine. The time of the gassing period was one hour. About 1600 g. of the gassed solution was diluted with 450 g. of chloroform to increase the solubility of the dissolved polymer, and this solution was amidated with liquid ammonia according to the procedure of Example 1. The resulting tough, swollen, gel-like polymer was treated with hot water (60°–70° C.) in an open vessel on a steam bath until most of the carbon tetrachloride and chloroform fumes were gone. The water was decanted, and fresh hot water was added several times during this washing period. The crude wet polymer was dissolved in a mixture of 1000 g. of methyl-isobutyl-ketone and 280 g. of xylene at 80°–90° C., and a small aqueous layer was separated after standing about six hours at this temperature. The resulting organic layer was a translucent liquid above about 65° C. and set up to a stiff gel at room temperature. The solution weighed 1303 g. and showed 11.7% solids. The solvent-free polymer showed by analysis 1.1% sulfur and 5.0% chlorine. By dipping a steel strip into this solution at 70°–80° C., drying at 90°–100° C. in an oven, dipping the coated strip in a 20% solution of electrical grade polythene in kerosene at 130° C., and baking the strip at 140° C. until the coating was essentially kerosene-free, it was possible to obtain a polythene-coated strip in which the polythene showed excellent bonding to the metal.

Example 7

By the same general procedure as in Example 1 a sample of low molecular weight polythene (30 poises viscosity at 125° C., about 7,000 M. W.) was converted to polythene sulfonyl chloride containing approximately 7% sulfur. A solution of 50 g. of this polymeric sulfonyl chloride in a mixture of 40 g. of carbon tetrachloride and 140 g. of chloroform was added to about 300 g. of liquid methyl amine at −40° C. to −50° C. over a period of 20 minutes. The essentially homogeneous reaction mass was stirred for one hour at −40° C. and allowed to warm up to room temperature overnight. The viscous light yellow mass was washed with water to remove some of the methylamine hydrochloride and the organic layer concentrated on a steam bath until thick enough to mill. The polymer was then washed and dried on the rubber mill. The dried brown polymer was considerably softer than the corresponding unsubstituted sulfonamide and a sheet of the product was very slick and almost oily to the touch. It could be handled readily on a cold or warm mill. A roll of the sheeted product flowed to a gummy mass on standing several days at about 25° C. The product showed by analysis 7.8% sulfur, 22.2% chlorine and 4.3% nitrogen.

Example 8

A sample of low molecular weight polythene (30 poise, viscosity at 125° C., about 7,000 M. W.) was converted to a sulfonyl chloride containing 6.7% sulfur, according to the procedure in Example 1. A solution of 281 g. of this sulfonyl chloride in 269 g. of methyl-isobutyl-ketone was added to about 250 g. of diethyl amine over a one hour period while the reaction temperature was maintained at −10° to −20° C. After stirring an additional hour at this temperature, the charge was allowed to warm up to room temperature overnight. The resulting light-orange solution was diluted with 700 cc. of methyl-isobutyl-ketone and washed five times with one liter portions of water. Ethanol was added to break the resulting emulsion. The methyl-isobutyl-ketone solution was a rather dark orange colored liquid that weighed 1250 g. and showed 23% solids on evaporation. This corresponds to a yield of 287 g. of polythene N,N-diethyl-sulfonamide. The active ingredient showed by analysis 5.8% sulfur, 3.2% nitrogen, and 13.9% chlorine. The film poured from the methyl-isobutyl-ketone solution was a very soft, tacky, non-drying material that suggests its possible use as a base for caulking compounds.

Example 9

Twenty grams of polythene sulfonyl chloride containing 7.4% sulfur and prepared from polythene having a viscosity of 30 poises at 125° C. (about 7,000 M. W.), was dissolved in 150 cc. of benzene, and this solution was added to an agitated solution of 100 g. of aniline and 50 cc. of benzene at 45°–50° C. The charge was then stirred 16 hours at 45° C., the solvent and excess aniline removed by steam distillation, and the polymeric residue washed and dried on a rubber mill. The polythene sulfonamide was a dark reddish brown, shiny, pliable, leather-like plastic sheet at room temperature, but became extremely brittle when cooled in ice water.

Example 10

By the same general procedure as in Example 1, a sample of low molecular weight polythene (125 poises viscosity at 125° C., about 9,000 M. W.) was converted to polytheme sulfonyl chloride containing 5.6% sulfur and 37% chlorine. A solution of 50 g. of this sulfonyl chloride in 90 g. of carbon tetrachloride was added over a 5 minute period to a mixture of 21 g. of piperidine and 315 g. of carbon tetrachloride. The temperature of the reaction mixture rose from 25° C. to 48° C. on adding the sulfonyl chloride. The charge was then heated to reflux for 4 hours after which the carbon tetrachloride was removed by steam distillation. The resulting tough, dough-like mass was washed and dried on a rubber mill to give 52 g. of an olive-brown, tough polymer similar in appearance to the product of Example 1 but being considerably more flexible and soft. By analysis the polythene sulfo-piperidide contained 5.7% sulfur, 2.7% nitrogen and 21.0% chlorine.

It will be understood that the procedures indicated in the above examples may be varied widely within the skill of those engaged in this art.

I am aware of U. S. Patent No. 2,458,841 to Elmore and Gessler, wherein the proposal was made to produce softening agents for rubber by treating polyolefine-polysulfonyl chlorides with convenient alkalis or amino-containing compounds to yield esters or amide-type materials. The products producible, however, according to the teachings of said patent are of entirely different chemical nature and have entirely different physical properties and utilities than the novel products of this specification; nor did the patent teach anything from which the novel physical properties of my products, or the special conditions required for their production, could be inferred.

For the purpose of the claims below, the terms "soluble," "solubility" shall be understood as implying a solubility of at least 2 grams of substance in 100 grams of solvent, whereas "insoluble" and "insolubility" shall be construed as falling short of this minimum. Also, the term "polythene sulfonamide" shall be understood to mean a compound characterized by the structure $$R\text{—}SO_2NR_1R_2$$

wherein R represents the continuous polymeric carbon chain of the polythene, while $NR_1R_2$ represents the radical of the nitrogenous base employed in forming the sulfonamide. The term "polythene" throughout this specification and claims is to be understood in its ordinary sense as established in the art; see for instance, McQueen, U. S. P. 2,212,786. In other words, polythenes are solid polymers of ethylene of formula $(CH_2)_x$, wherein $x$ is sufficiently large to give the polymer an average molecular weight of at least 1000. They show a crystalline structure when subjected to X-ray diffraction analysis and melt at temperatures above 100° C.

I claim as my invention:

1. A polyethylene sulfonamide comprising a fundamental polyethylene molecule of molecular weight between 9,000 and 12,000 and having a sufficient number of sufonamide radicals per molecule to give a sulfur analysis of between 2% and 8%.

2. A polyethylene sulfonamide as in claim 1, the molecule containing further combined chlorine to an amount of between 5% and 40% by weight.

3. A polyethylene sulfonamide having a basic polyethylene molecule of molecular weight between 9,000 and 12,000 and a sulfur analysis of between 2% and 8%, and being a thermoplastic body adapted to form a continuous film upon being molten, spread out and cooled, and being further characterized by solubility in methyl-isobutyl ketone and by insolubility in carbon tetrachloride.

4. A polyethylene sulfonamide as in claim 3, the sulfonamide radicals whereof have the general form $SO_2\text{—}NR_1R_2$, wherein $R_1$ and $R_2$ are members of the group consisting of hydrogen and hydrocarbon radicals of not over 8 carbon atoms.

5. A polyethylene sulfonamide as in claim 3, the sulfonamide radicals whereof have the form $SO_2\text{—}NH_2$.

6. A transparent film consisting of polyethylene polysulfonamide.

7. A lacquer comprising polyethylene sulfonamide as film-forming agent and, as solvent therefor, a liquid aliphatic compound selected from the group consisting of the lower aliphatic esters and lower aliphatic ketones.

HARRIS WALTON BRADLEY.

REFERENCES CITED

The following references are of record in the file of this patent:

UNITED STATES PATENTS

| Number | Name | Date |
|---|---|---|
| 2,321,890 | Berchet | June 15, 1943 |
| 2,458,841 | Elmore | Jan. 11, 1949 |

OTHER REFERENCES

Maibauer; Electrochemical Society, Preprint 90–36, page 454, 1946.

Reynolds et al., J. Am. Chem. Soc., 69, pages 911–915, April 1947.